(12) United States Patent
Huang

(10) Patent No.: US 8,584,368 B2
(45) Date of Patent: Nov. 19, 2013

(54) POSITION RESTRICTION STRUCTURE OF SCISSORS

(75) Inventor: Yao-Chung Huang, Changhua (TW)

(73) Assignee: Ho Cheng Garden Tool Co. Ltd., Changhua (TW)

( * ) Notice: Subject to any disclaimer, the term of this patent is extended or adjusted under 35 U.S.C. 154(b) by 215 days.

(21) Appl. No.: 13/326,124

(22) Filed: Dec. 14, 2011

(65) Prior Publication Data

US 2013/0152404 A1   Jun. 20, 2013

(51) Int. Cl.
*B26B 13/26* (2006.01)

(52) U.S. Cl.
USPC .............................. 30/252; 30/254

(58) Field of Classification Search
USPC ........... 30/193, 194, 192, 198, 244, 245, 254, 30/252, 246, 250, 251, 131, 134, 145, 261, 30/271, 132
See application file for complete search history.

(56) References Cited

U.S. PATENT DOCUMENTS

| | | | | |
|---|---|---|---|---|
| 488,959 A * | 12/1892 | Brandenburg | ................. | 30/250 |
| 2,084,633 A * | 6/1937 | Erickson | ...................... | 81/365 |
| 2,528,816 A * | 11/1950 | Boyer | ............................ | 30/238 |
| 2,535,215 A * | 12/1950 | Klenk | ............................ | 81/347 |
| 4,178,682 A * | 12/1979 | Sadauskas | .................... | 30/250 |
| 5,325,591 A * | 7/1994 | Orthey | .......................... | 30/252 |
| 5,570,510 A * | 11/1996 | Linden | .......................... | 30/250 |
| 5,761,815 A * | 6/1998 | Lin | ................................ | 30/251 |
| 5,809,654 A * | 9/1998 | Huang | .......................... | 30/134 |
| 6,345,446 B1 * | 2/2002 | Huang | .......................... | 30/250 |
| 6,789,324 B2 * | 9/2004 | Linden et al. | ................. | 30/245 |
| 6,829,829 B1 * | 12/2004 | Huang | .......................... | 30/252 |
| 7,178,245 B1 * | 2/2007 | Lee | ................................ | 30/254 |
| D638,676 S * | 5/2011 | Huang | ............................ | D8/5 |
| 8,166,659 B2 * | 5/2012 | Huang | .......................... | 30/254 |
| 8,220,164 B2 * | 7/2012 | Linden et al. | ................. | 30/252 |
| 8,225,513 B2 * | 7/2012 | Huang | .......................... | 30/254 |
| 8,327,549 B2 * | 12/2012 | Huang | .......................... | 30/251 |
| 2003/0136008 A1 * | 7/2003 | Lin | ................................ | 30/250 |
| 2003/0140501 A1 * | 7/2003 | Linden et al. | ................. | 30/252 |

FOREIGN PATENT DOCUMENTS

| | | | | |
|---|---|---|---|---|
| CN | 201238499 Y | * | 5/2009 | |
| CN | 201338281 Y | * | 11/2009 | |
| CN | 201976485 U | * | 9/2011 | |
| DE | 29822421 U1 | * | 3/1999 | |
| FR | 2569602 A1 | * | 3/1986 | |

\* cited by examiner

*Primary Examiner* — Kenneth E. Peterson
*Assistant Examiner* — Jennifer Swinney
(74) *Attorney, Agent, or Firm* — Che-Yang Chen; Law Office of Michael Chen

(57) ABSTRACT

A position restriction structure of scissors includes a main body, a second body, a driving handle, a connecting piece, a restricting piece and a plurality of hinged units, wherein a main hinge hole and a second hinge hole provided for the second body and the driving handle are through and passing through a center portion of the main body, and the second body and the driving handle have a gearing teeth portion and a activating teeth portion engaged with each other. The restricting piece attaches to one side of the second body and driving handle and the hinge unit passes therethrough. The restricting piece clamps the second body and the driving handle through a screw and screw nut of the hinge unit to restrict axial position of the gearing teeth portion and activating teeth portion to prevent the second body from shear forces and to improve durability of the product.

4 Claims, 14 Drawing Sheets

POSITION RESTRICTION STRUCTURE OF SCISSORS

FIELD OF THE INVENTION

The present invention relates to a position restriction structure of scissors with teeth engaging movement, and more particularly to a restricting piece to clamp a second body and driving handle through a screw and a screw nut of a hinge unit, and further to restrict the axial position of a gearing teeth portion and a activating teeth portion to prevent the second body from being bended by shear forces. So, the precision of the teeth engagement of the gearing teeth portion and the activating teeth portion can be assured to improve the durability of the product.

BACKGROUND OF THE INVENTION

A conventional scissors structure as shown in FIGS. 13 and 14 includes a scissor main body (70), a cutting tool (80) and a handle portion (90), wherein the scissor main body (70) has a pulley base (71) underneath, and a scissor base (72) is disposed on top of the pulley base (71). A hinge hole (73) is through and at center of the scissor base (72), and a curved cutting portion (74) is extended from one side the hinge hole (73). The other side thereof has a moving teeth portion (75), and a resilient unit (76) is disposed on top of the scissor base (72). An axial hole (81) is formed at center of the cutting tool (80) to conjugate with the hinge hole (73) of the scissor main body (70), and a blade (82) and a connecting arm (83) are extended from the axial hole (81). A second hinge hole (84) is formed near the rear end of the connecting arm (83), and a driving teeth portion (91) is formed at one end of the handle portion (90), wherein the driving teeth portion (91) engages with the moving teeth portion (75) of the scissor main body (70). A hinge connecting hole (92) is formed near the driving teeth portion (91) to conjugate with the second hinge hole (84) of the cutting tool (80). A connecting portion (93) is formed at the other end of the handle portion (90) and an inner portion of the conjugating portion (93) is connected with the resilient unit (76) of the scissor main body (70). An outer portion thereof has a pulley set (94), and the a pulling string (95) is disposed between the pulley set (94) and the pulley base (71) of the scissor main body (70), so that the cutting tool (80) can continue to perform cutting through the pulling string (95) and the resilient unit (76).

The conventional scissors structure is disadvantageous because when the cutting tool is under shear forces, the handle portion (90) and the scissor main body (70) sustain a huge amount of torque, so the driving teeth portion (91) of the handle portion (90) can be moved axially to generate misalignment, and the handle portion (90) may not transmit forces through the teeth. Therefore, there remains a need for a new and improved scissors structure to overcome the problem addressed above.

SUMMARY OF THE INVENTION

The problem to be solved in the present invention is that when the cutting tool is under shear forces, the handle portion and the scissor main body sustain a huge amount of torque, so the driving teeth portion of the handle portion can be moved axially to generate misalignment, and the handle portion may not transmit forces through the teeth.

The technical point to solve the problem is to provide a position restriction structure of scissors with teeth engaging movement, including a main body, a second body, a driving handle, a connecting piece, a restricting piece and a plurality of hinged units. A main hinge hole is through and passing through the center portion of the main body, and a second hinge hole is through from one side of the main hinge hole, and a curved tool portion is extended downward from the other side of the main hinge hole. The second body has a through rotating hole, and a second tool portion is extended from one side of the rotating hole. An extended section is extended from one side of the rotating hole, and the extended section is bended to form a gearing teeth portion. The gearing teeth portion has a through hole outside, and the rotating hole, extended section, and gearing teeth portion define a receiving space. The driving handle has a conjugating portion that is located at the receiving space of the second body. A conjugating hole and an activating teeth portion are formed corresponding to the rotating hole and the gearing teeth portion, respectively. A second through hole is formed near the gearing teeth portion. The restricting piece has a third through hole on one side, and a sliding trough is formed on one side of the third through hole. According to the structure above, the rotating hole of the second body and the conjugating hole of the driving handle are aligned with the main hinge hole and second hinge hole of the main body. The activating teeth portion of the driving handle engage with the gearing teeth portion of the second body. Also, the restricting piece attaches to one side of the second body and driving handle, and the third through hole and the sliding trough align with the second through hole of the second body and driving handle, and the hinge unit passes through the structure set above to obtain a position restriction structure of scissors with teeth engaging movement.

DETAILED DESCRIPTION OF THE INVENTION

Figure 1:
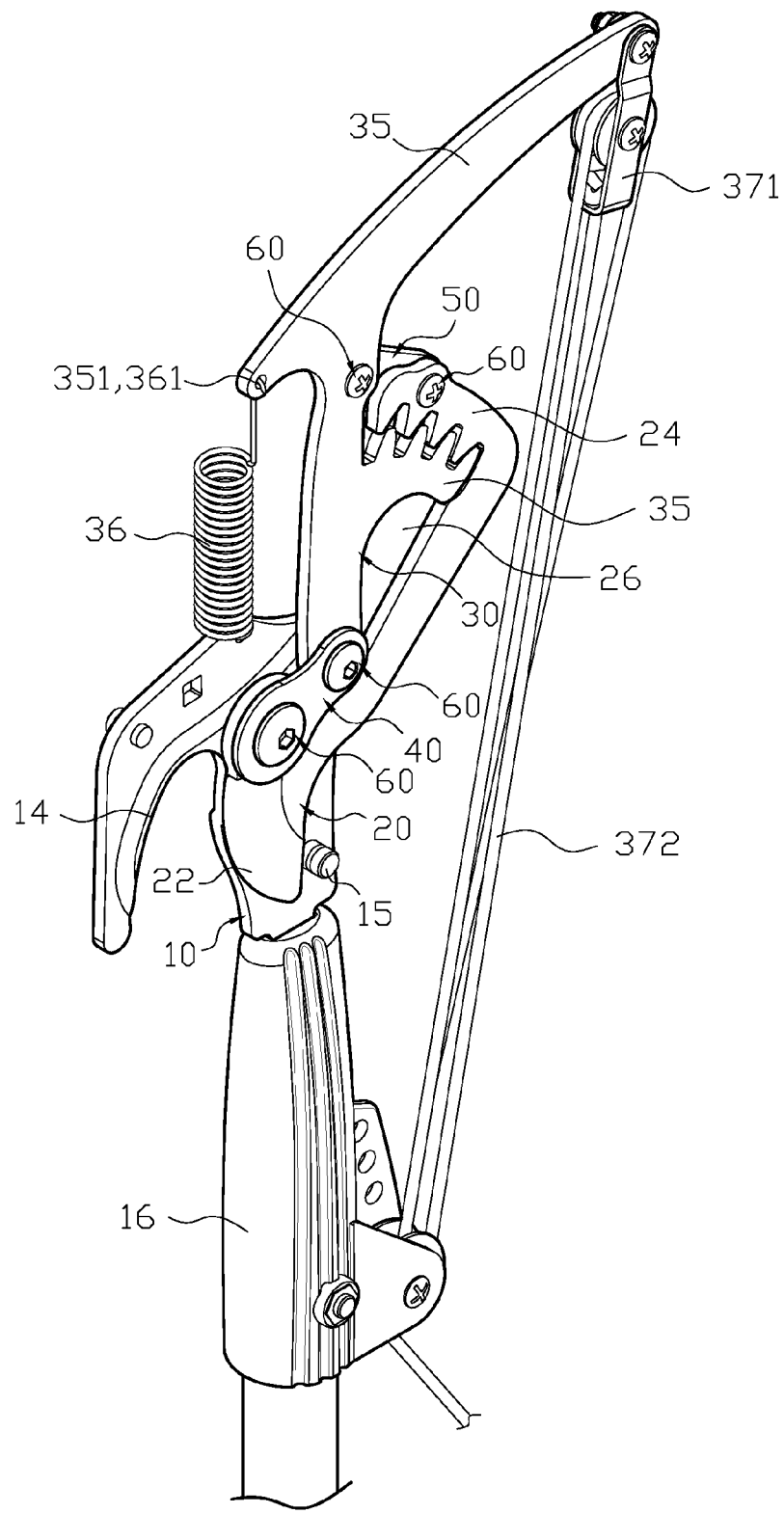
FIG. 1 illustrates a three-dimensional assembled view of the first embodiment in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, a position restricted structure of a scissor using branch scissors as a first embodiment includes a main body (10), a second body (20), a driving handle (30), a connecting piece (40), a restricting piece (50) and a plurality of hinged units (60). A hook hole (11) is located on top of the main body (10), and a main hinge hole (12) is through and passing through the center portion thereof. A second hinge hole (13) is through from one side of the main hinge hole (12), and a curved tool portion (14) extended downward from the other side of the main hinge hole (12), wherein the tool portion (14) can be anvil or blade. A stopping unit (15) is formed at lower portion of the main body (10), and a pulley base (16) is formed at bottom portion of the main body (10). The second body (20) has a through rotating hole (21), and a second tool portion (22) is extended from one side of the rotating hole (21), wherein the second tool portion (22) can be anvil or blade. An extended section (23) is extended from one side of the rotating hole (21), and the extended section (23) is bended to form a gearing teeth portion (24). The gearing teeth portion (24) has a through hole (25) outside, and the rotating hole (21), extended section (23), and gearing teeth portion (24) define a receiving space (26). A cutting position is generated when the second tool portion (22) and the tool portion (14) of the main body (10) are in a cutting status, and a non-cutting position is also generated when the second tool portion (22) and the tool portion (14) of the main body (10) are in a separate status. The driving handle (30) has a conjugating portion (31) that is located at the receiving space (26) of the second body (20). A conjugating hole (32) and an activating teeth portion (33) are formed corresponding to the rotating hole (21) and the gearing teeth portion (24), respectively. A second through hole (34) is formed near the gearing teeth portion (24), and a extended arm (35) is bended upward from the conjugating portion (31), wherein the extended arm (35) has a second hook hole (351) on one side thereof, and the second hook hole (351) and the hook hole (11) of the main body (10) are connected by a resilient unit (36). The resilient unit (36) is a spring that forms a hooking end (361) on both sides thereof, and the hooking ends (361) engage with the second hook hole (351) of the extended arm (35) and the hook hole (11) of the main body (10). The other side of the extended arm (35) has a hinge opening (37) having a pulley set (371) that has a string (372) tied at the pulley base (16). The connecting piece (40) has a main connecting hole (41) and a secondary connecting hole (42) formed spacedly. The restricting piece (50) has a third through hole (51) on one side, and a sliding trough (52) is formed on one side of the third through hole (51).

Figure 2:
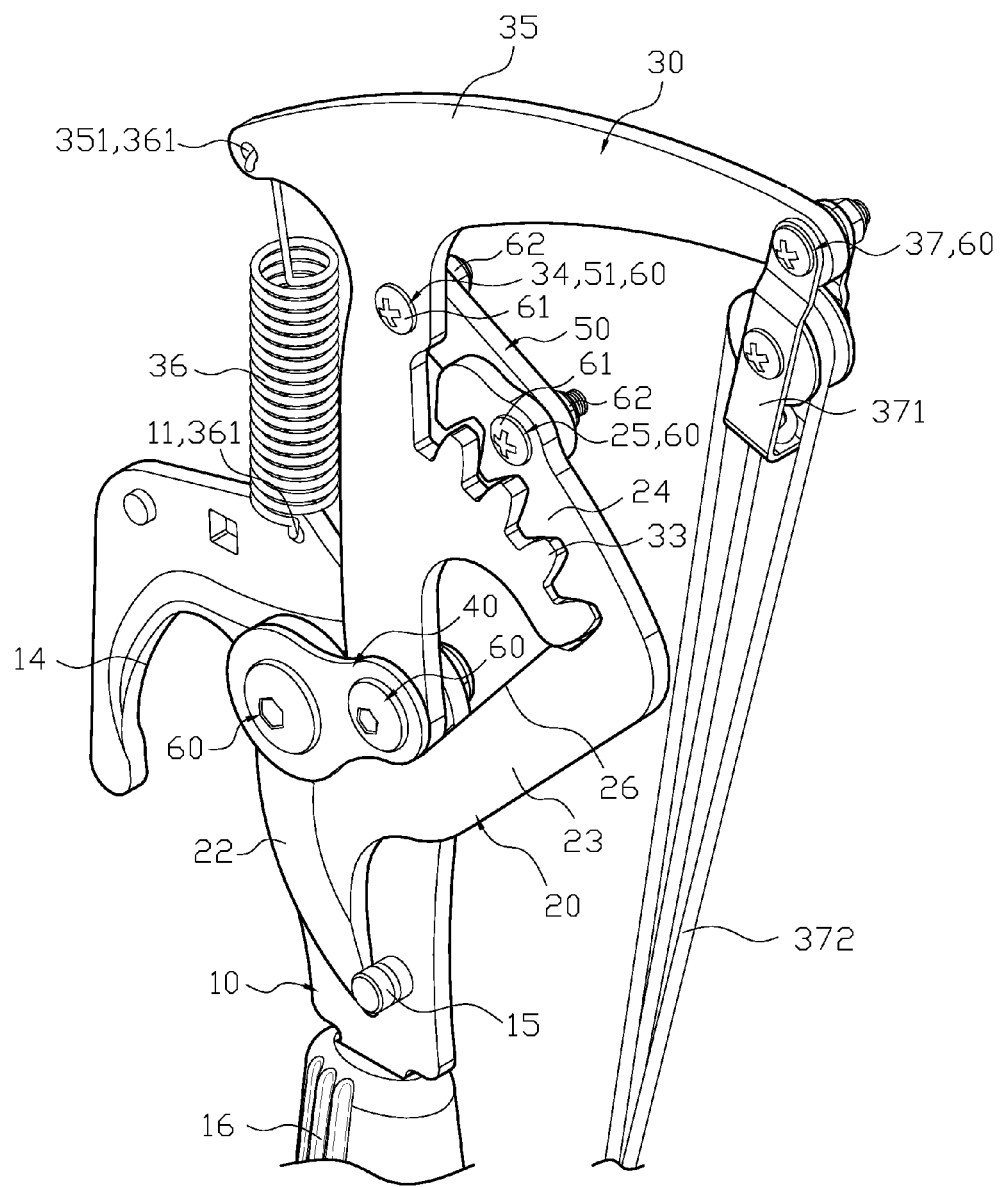
FIG. 2 illustrates a three-dimensional assembled view of the first embodiment from another angle in the present invention.
Figure 3:
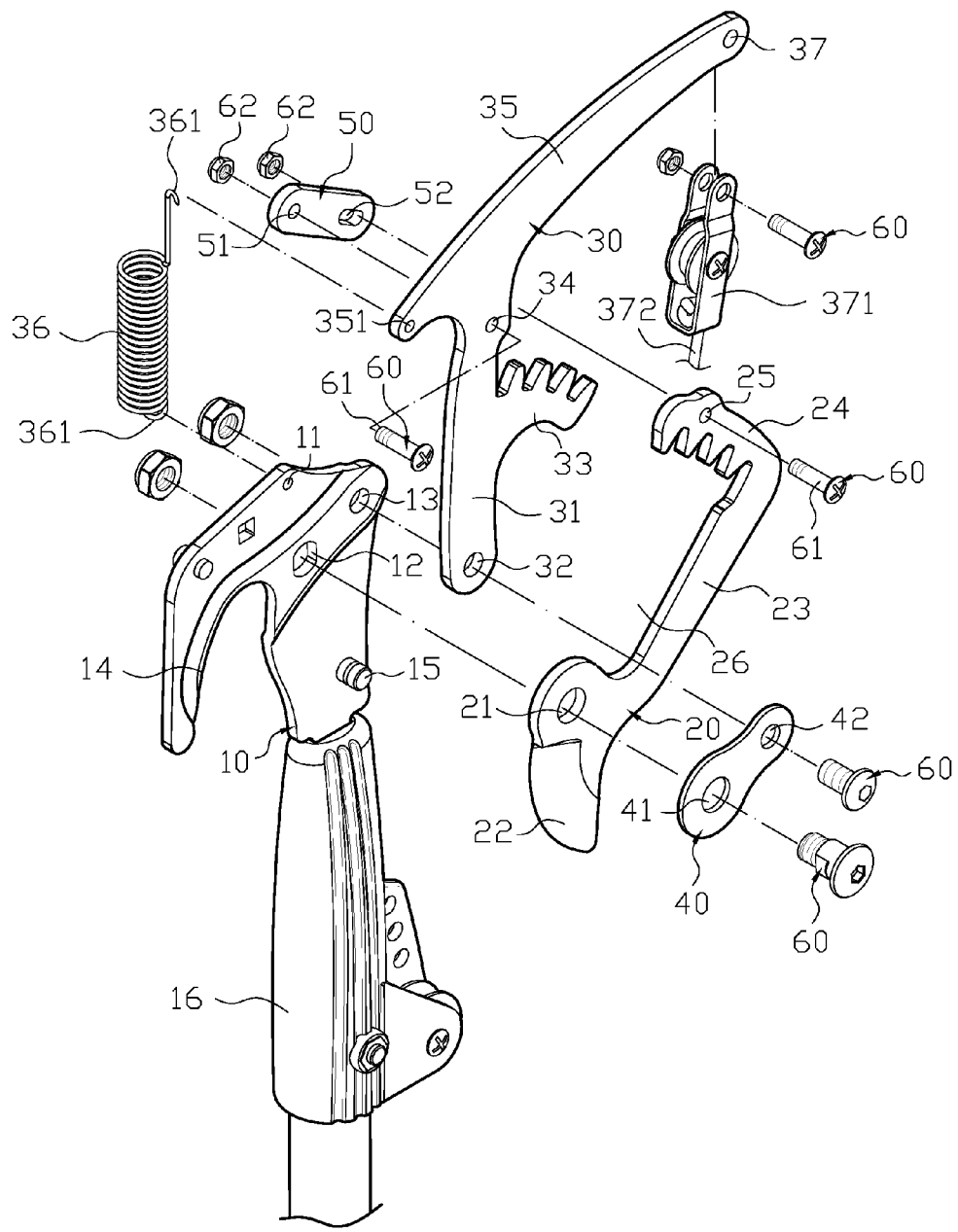
FIG. 3 illustrates a three-dimensional exploded view of the first embodiment in the present invention.
Figure 4:
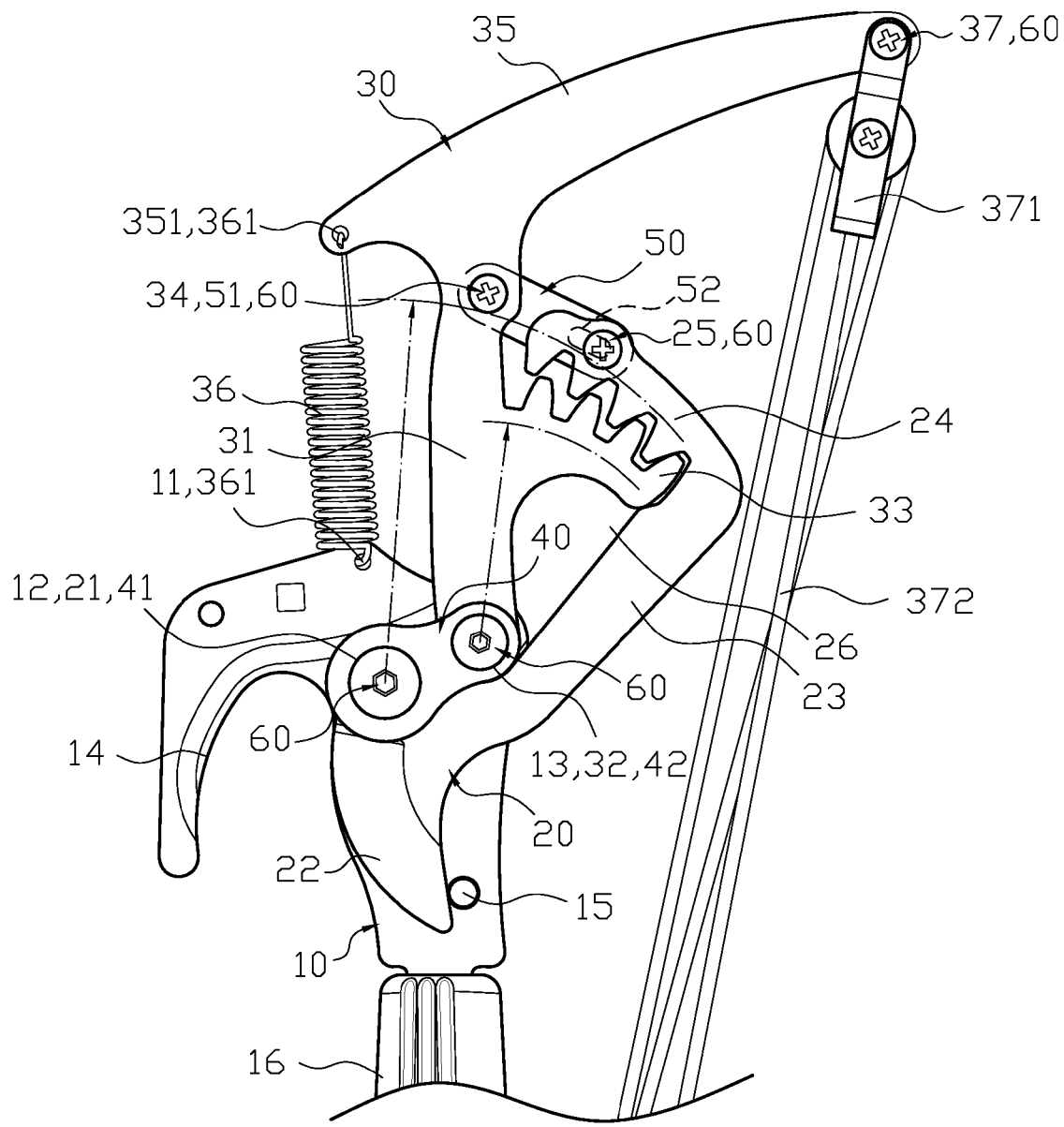
FIG. 4 illustrates a lateral view of the first embodiment in the present invention.

Referring to FIGS. 2 and 3 for the structure, the rotating hole (21) of the second body (20) and the conjugating hole (32) of the driving handle (30) are aligned with the main hinge hole (12) and second hinge hole (13) of the main body (10). The activating teeth portion (33) of the driving handle (30) engage with the gearing teeth portion (24) of the second body (20), and the tool portion (22) of the second body (20) is against the rear end of the stopping unit (15) of the main body (10) to form a stopping effect, so as to form a maximum opening of the tool portion (14) of the main body (10) and the second tool portion (22) of the second body (20). The hooking ends (361) of the resilient unit (36) engage with the second hook hole (351) of the extended arm (35) and the hook hole (11) of the main body (10), and the string (372) is disposed between the pulley set (371) and the pulley base (16). The connecting piece (40) attaches to one side of the second body (20) and the driving handle (30), and the hinged unit (60) passes therethrough, so that the connecting piece (40) and the main body (10) form a status to clamp the second body (20) and the driving handle (30), so that the second body (20) and the driving handle (30) are restricted to slide, and the rotating hole (21) and the conjugating hole (32) are secured and disposed in a predetermined distance. The restricting piece (50) aligns with the through hole (25) and second through hole (34) of the second body (20) and driving handle (30) through the third through hole (51) and the sliding trough (52). Also, the restricting piece (50) passes through the set with the hinged unit (60) and forms a status to clamp the second body (20) and the driving handle (30) via a screw (61) and a screw nut (62) of the hinged unit (60), so as to restrict the axial position of the gearing teeth portion (24) and the activating teeth portion (33) to complete the assembly process.

Figure 5:
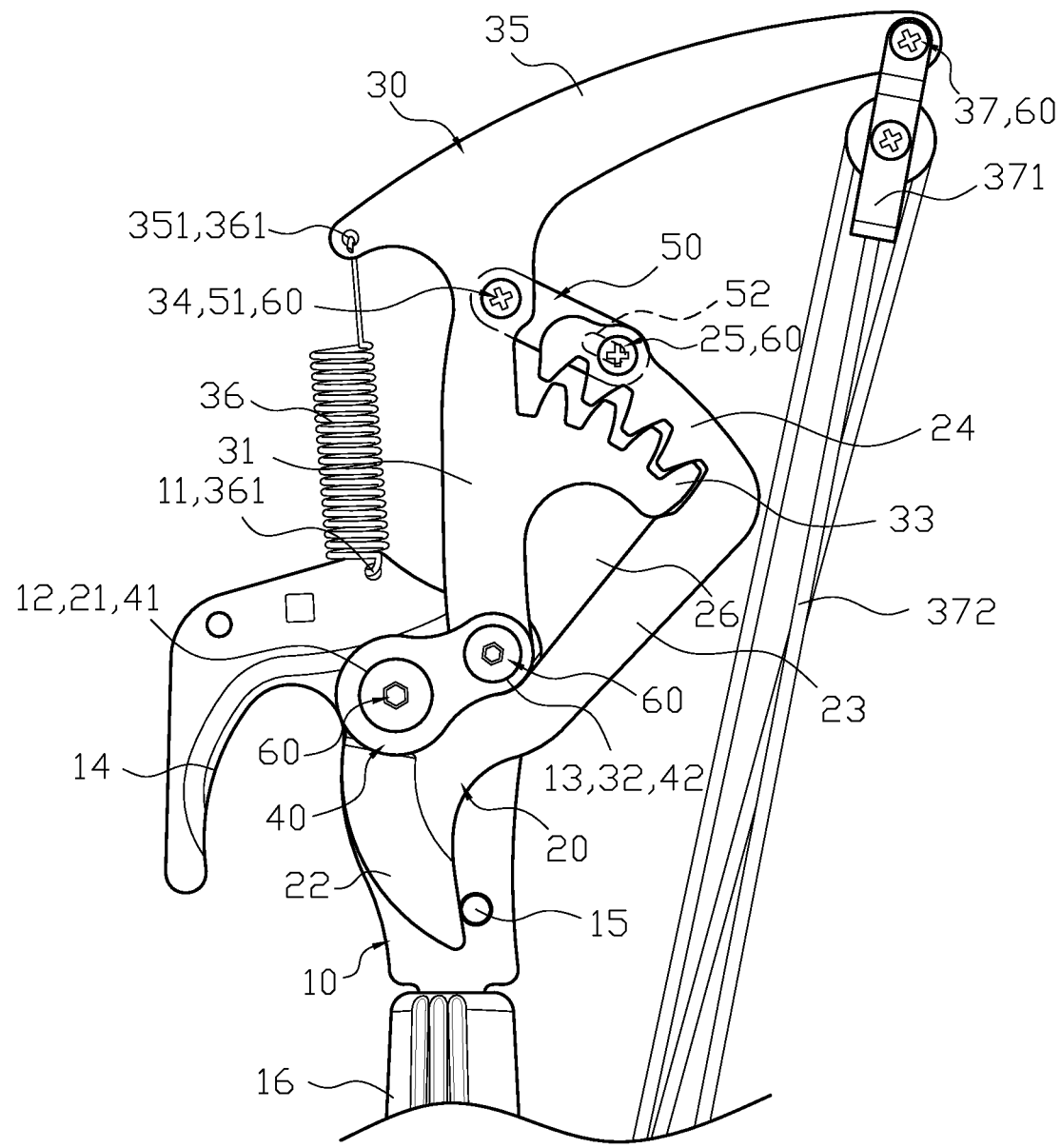
FIG. 5 illustrates a lateral view of the first embodiment that is not in a cutting position in the present invention.
Figure 6:
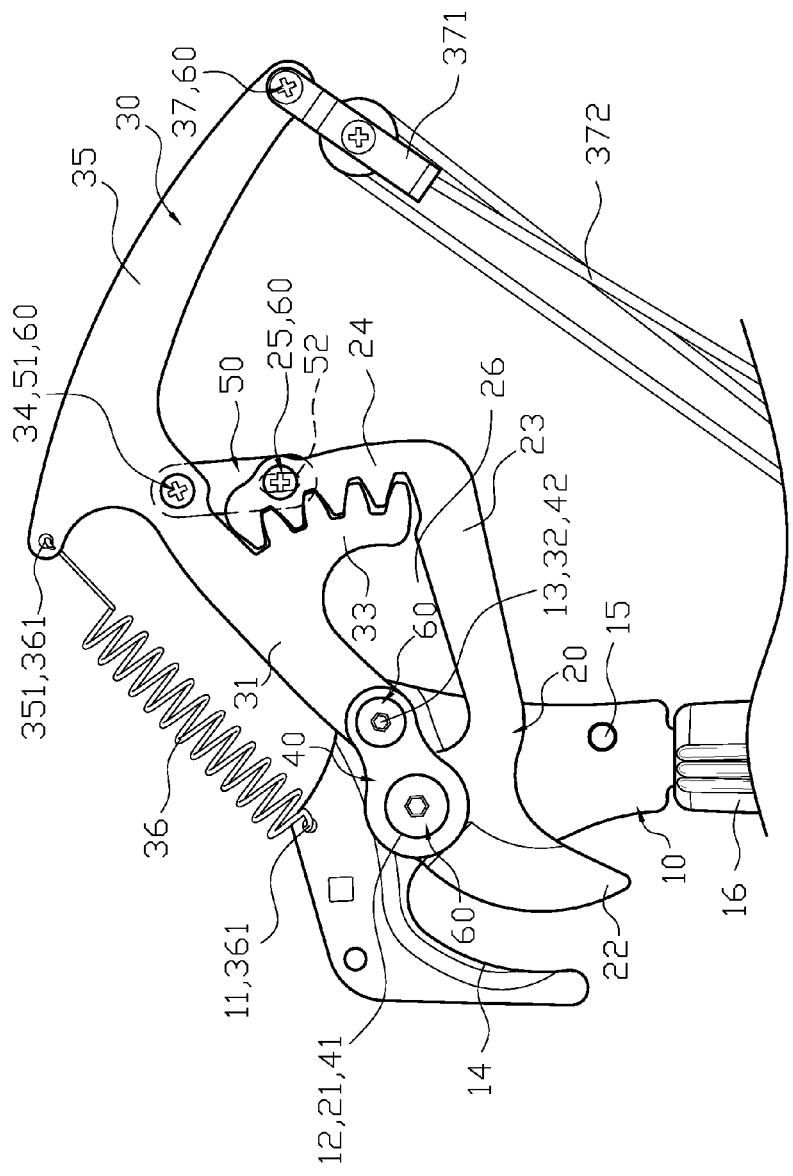
FIG. 6 illustrates an action view of the first embodiment that is in a cutting position in the present invention.
Figure 7:
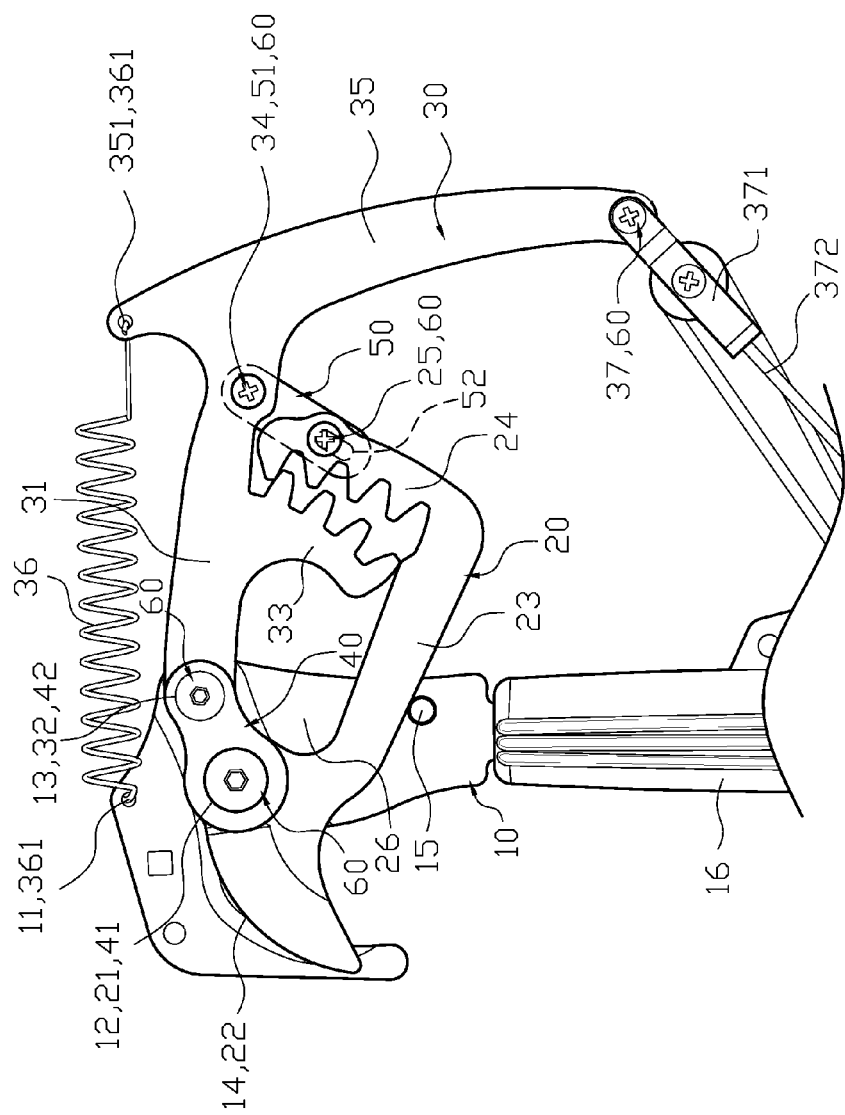
FIG. 7 illustrates a lateral view of the first embodiment that is in a cutting position in the present invention.

When in use, referring to FIGS. 5 to 7, when a user pulls the string (372) of the driving handle (30), the driving handle (30) swings downward through the second hinge hole (13) of the main body (10), and pulls the resilient unit (36). Also, the gearing teeth portion (24) of the second body (20) is driven by the activating teeth portion (33), so that the second body (20) swings towards the same direction via the main hinge hole (12) of the main body (10). Meanwhile, due to the simultaneous movement of the second body (20) and the driving handle (30), the gearing teeth portion (24) is connected with the restricting piece (50), and when the driving handle swings downward, the restricting piece (50) swings inward via the third through hole (51), so that the hinged unit (60) in the sliding trough (52) of the restricting piece (50) of the second main body (20) moves towards the third through hole (51). The restricting piece (50) can form a status to clamp the second body (20) and the driving handle (30) to restrict axial position of the gearing teeth portion (24) and activating teeth portion (33) via the screw (61) and screw nut (62) of the hinged unit (60), so that the gearing teeth portion (24) and activating teeth portion (33) can only move within the teeth to form a stable movement. Also, with the torque generated by the combined arm length of the second body (20) and the driving handle (30), the present invention achieves a goal of cutting without exerting too much force. When starting to cut, the string (372) is released and the driving handle (30) is restored with the pulling force of the resilient unit (36). Also, since the activating teeth portion (33) of the driving handle

(30) and the gearing teeth portion (24) of the second body (20) move coherently, the second tool portion (22) of the second body (20) is separated from the tool portion (14) of the main body (10), so that the second tool portion (22) of the second body (20) is against the rear end of the stopping unit (15) of the main body (10) to form the stopping effect, namely restoring to a non-cutting position.

Figure 8:
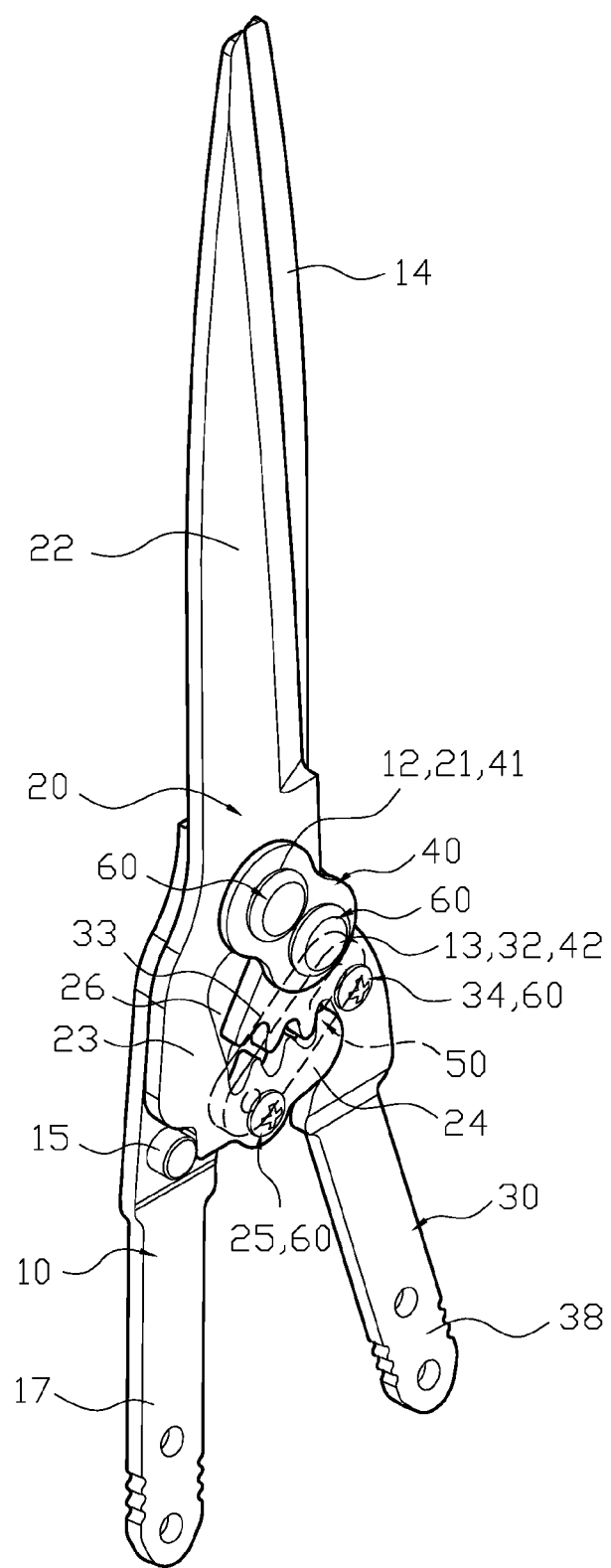
FIG. 8 illustrates a three-dimensional assembled view of the second embodiment in the present invention.
Figure 9:
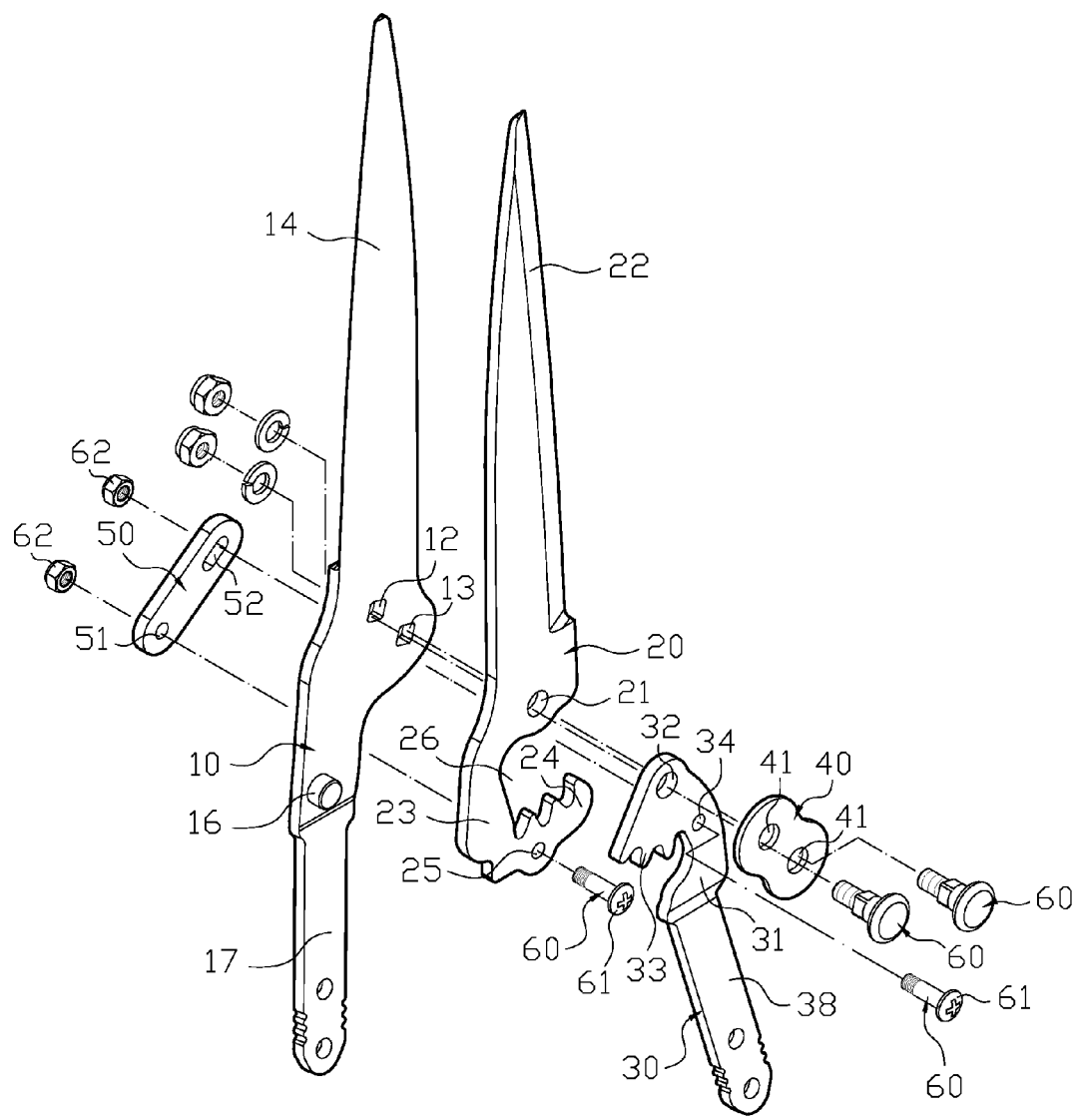
FIG. 9 illustrates a three-dimensional exploded view of the second embodiment in the present invention.
Figure 10:
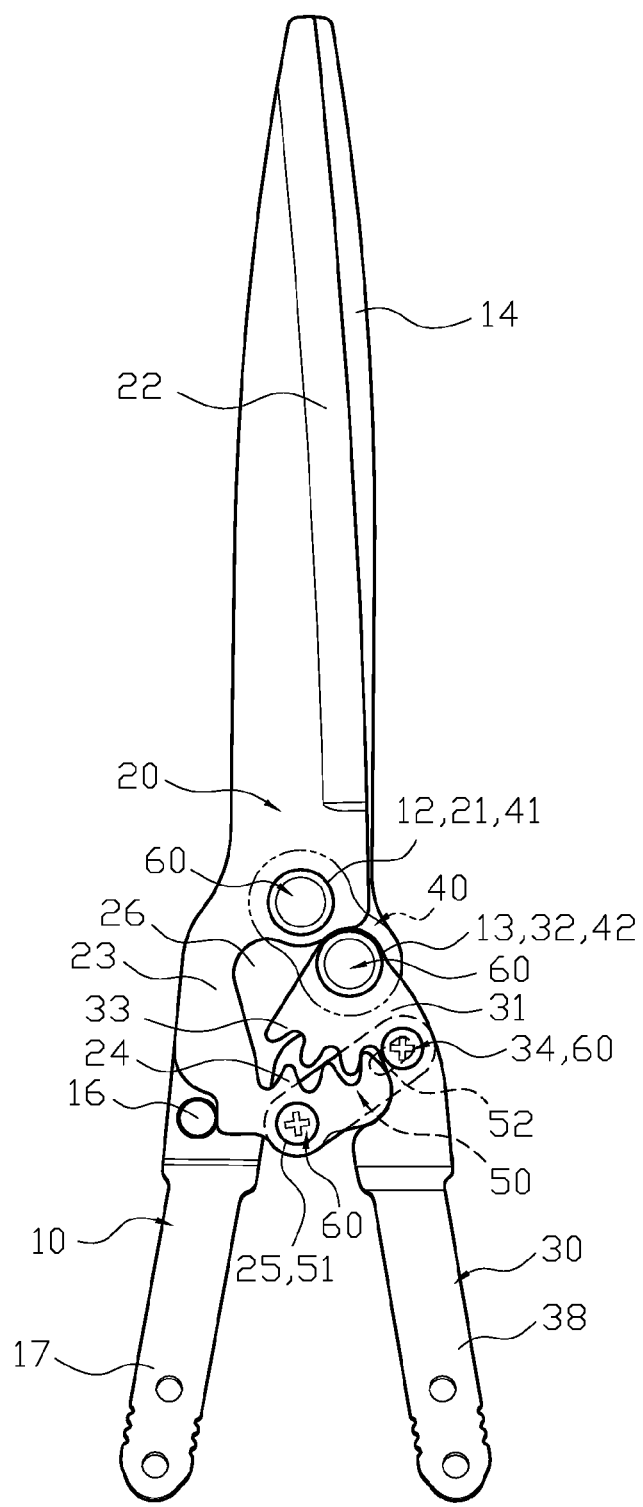
FIG. 10 illustrates a two-dimensional view of the second embodiment in the present invention.
Figure 11:
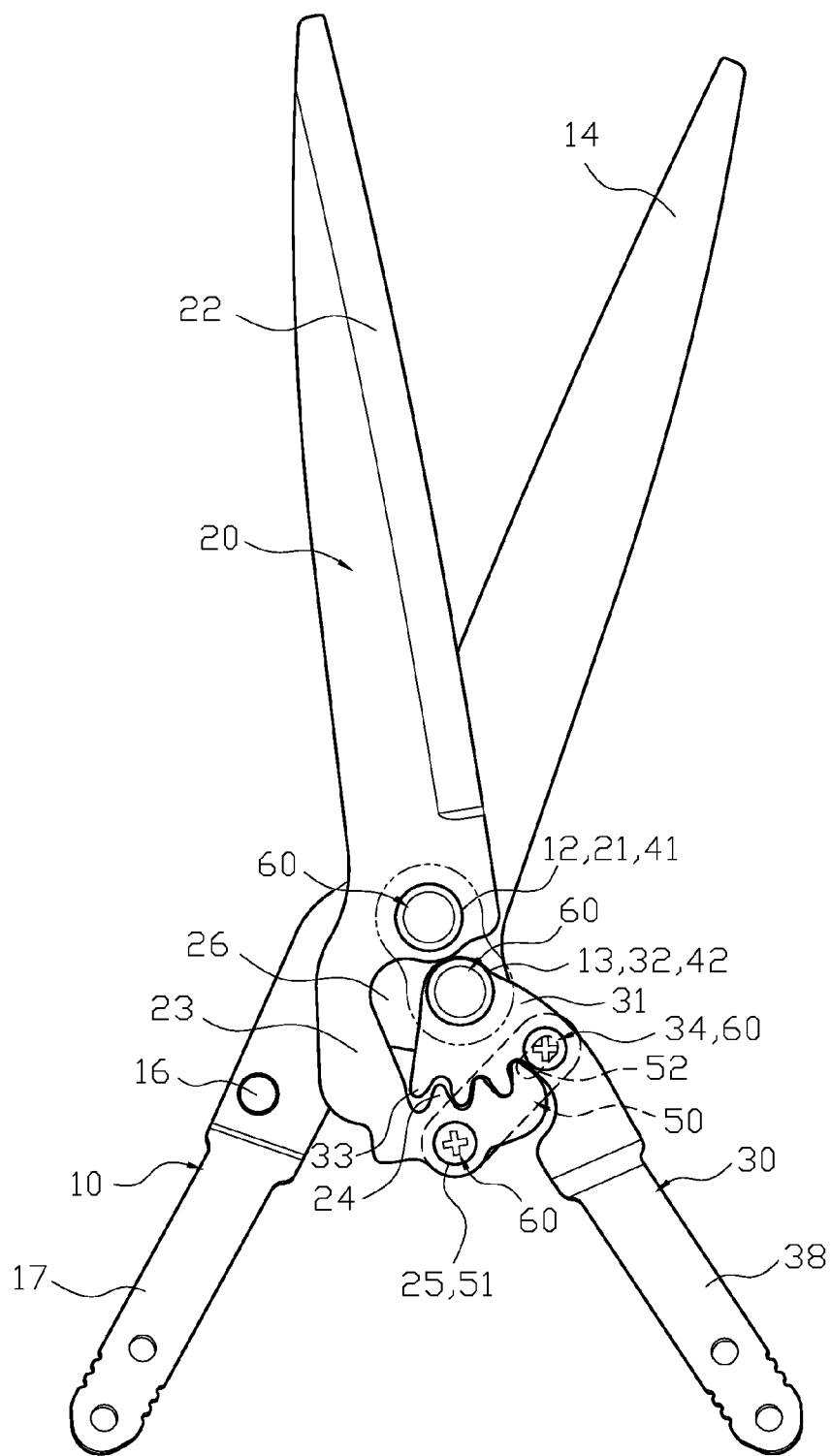
FIG. 11 illustrates an action view of the second embodiment in the present invention.
Figure 12:
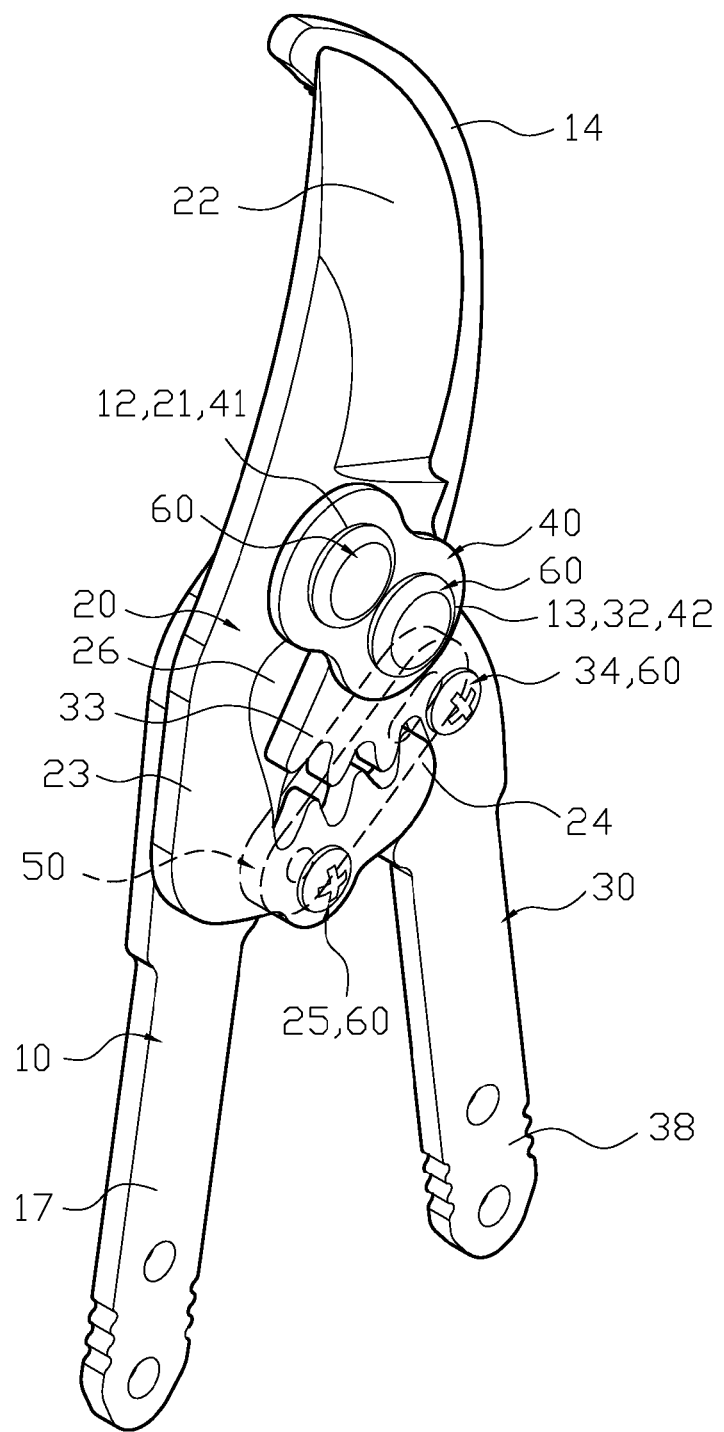
FIG. 12 illustrates a three-dimensional assembled view of the third embodiment in the present invention.
Figure 13:
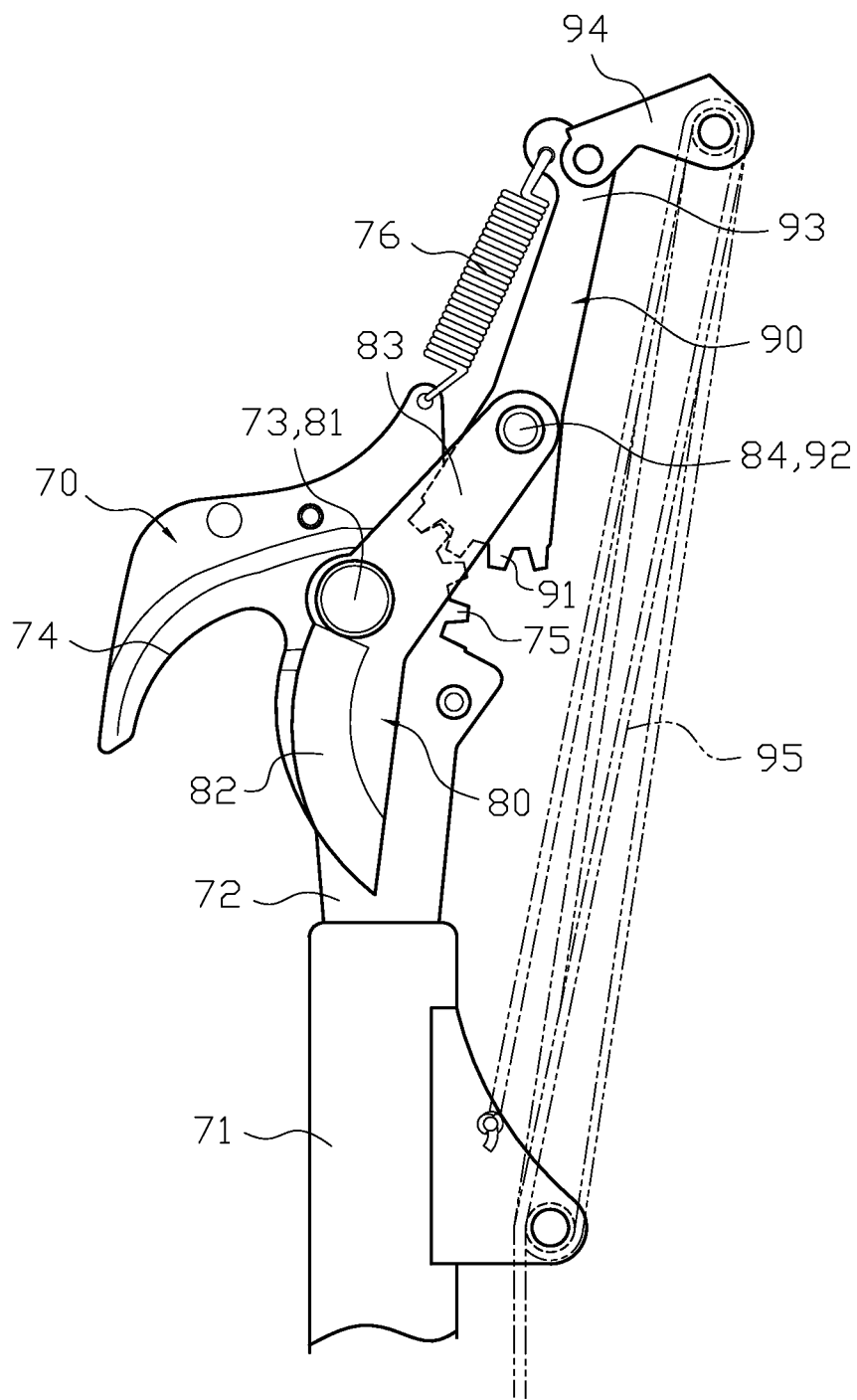
FIG. 13 illustrates a two-dimensional view of the prior art.
Figure 14:
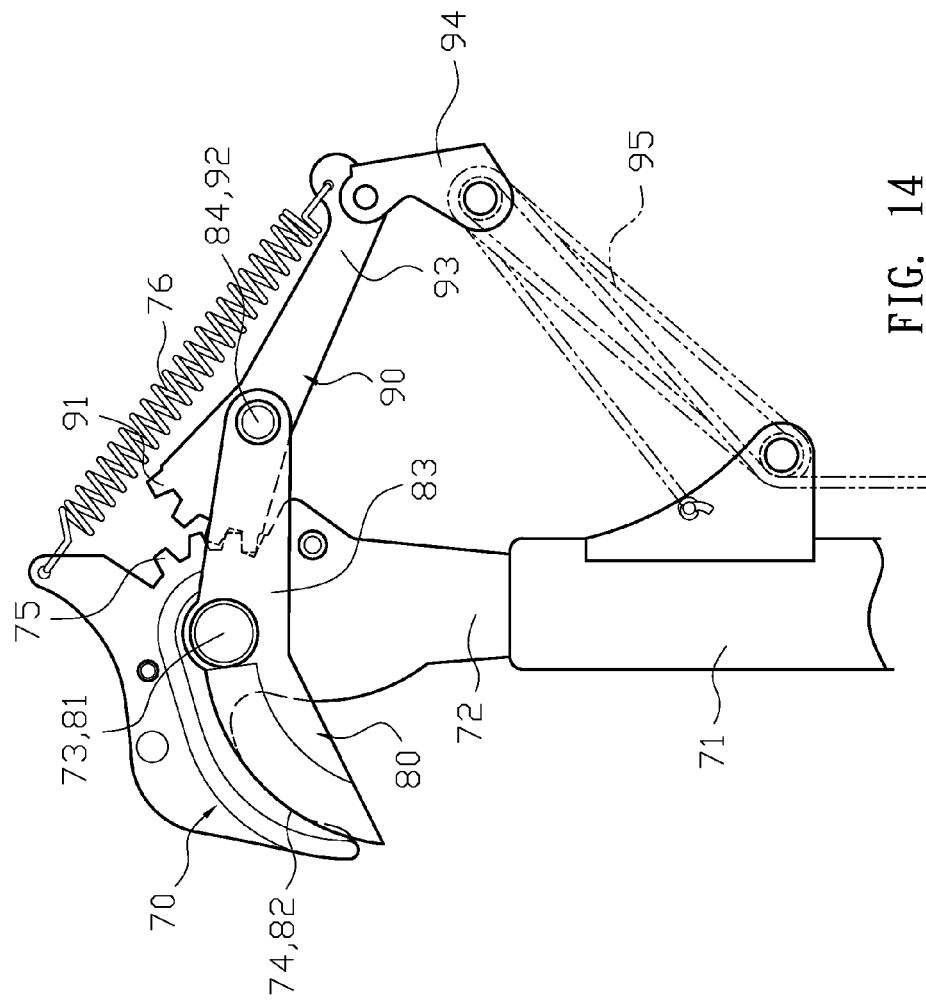
FIG. 14 illustrates a schematic action view of the prior art.

Referring to FIGS. 8 and 9 for a second embodiment of the present invention, the tool portion (14) of the main body (10) extends upward through the main hinge hole (12) with a straight blade shape, and extends downward through the main hinge hole (12) to form a handle (17). The second body (20) extends upward through the rotating hole (21) to form a second tool portion (22) with a straight blade shape. In the second embodiment, the second tool portion (22) of the second body (20) and the tool portion (14) of the main body (10) are cutting grass in a straight blade status. In a third embodiment, the tool portion (14) of the main body (10) and the second tool portion (22) of the second body (20) are a blade and an anvil, respectively, to form a status of branch cutting (see FIG. 12) so the cutting tool can be used to cut thick items such as tree branches. Also, in the second and third embodiments, the conjugating portion (31) of the driving handle (30) is disposed in the receiving space (26) of the second body (20), and the fan-shaped activating teeth portion (33) is formed corresponding to the gearing teeth portion (24). One side of the activating teeth portion (33) extends downward to form a second handle (38), and connects with the gearing teeth portion (24) of the main body (10) and the activating teeth portion (33) of the second body (20) through the restricting piece (50). The restricting piece (50) aligns with the through hole (25) and second through hole (34) of the gearing teeth portion (24) and the activating teeth portion (33) via the third through hole (51) and the sliding trough (52). The hinged unit (60) passes therethrough, so the restricting piece (50) can engage with the screw (61) and the screw nut (62) of the hinged unit (60) to clamp the second body (20) and the driving handle (30). The axial position of the gearing teeth portion (24) and the activating teeth portion (33) is also restricted. Referring to FIGS. 10 and 11 for practical usage in the present invention, when the user opens up the second handle (38) of the driving handle (30), the driving handle (30) swings via the second hinge hole (13) of the main body (10), and drives the gearing teeth portion (24) of the second body (20) through the activating teeth portion (33), so that the second body (20) is rotated around the main hinge hole (12) of the main body (10) to enable the second tool portion (22) of the second body (20) to cut. During the cutting process, the restricting piece (50) swings around the third through hole (51) and the hinged unit (60) at the second through hole (34) of the driving handle (30) can slide back and forth in the sliding trough, so that the precision of the teeth engagement of the gearing teeth portion (24) and the activating teeth portion (33) can be assured by the restricting piece (50) without affecting the movement between the second body (20) and the driving handle (30).

According to the embodiment stated above, the present invention is advantageous because the second body (20) and the driving handle (30) are formed on the main hinge hole (12) and second hinge hole (13) of the main body (10) through the rotating hole (21) and conjugating hole (32), so that the garden scissor structure can evenly spread the shear force when cutting to prevent the hinged unit (60) from being bended and reformed due to huge shear force. So, the precision of the teeth engagement of the gearing teeth portion (24) and the activating teeth portion (33) can be assured to improve the smoothness of the cutting.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A pair of scissors, comprising a main body, a second body, a driving handle, a connecting piece, a position restricting piece and a plurality of hinged units,
    wherein a main hinge hole is through and passing through a center portion of the main body, and a second hinge hole is through from one side of the main hinge hole, and a tool portion is extended downward from the other side of the main hinge hole;
    the second body has a through rotating hole, and a second tool portion is extended from one side of the rotating hole, wherein an extended section is extended from one side of the rotating hole, and the extended section is bent to form a gearing teeth portion that has a through hole outside, and the rotating hole, extended section, and gearing teeth portion define a receiving space;
    the driving handle has a conjugating portion that is located at the receiving space of the second body, and a conjugating hole and an activating teeth portion are formed corresponding to the rotating hole and the gearing teeth portion, respectively, and a second through hole is formed near the gearing teeth portion; and
    the restricting piece has a third through hole on one side, and a sliding trough is formed on one side of the third through hole,
    wherein the rotating hole of the second body and the conjugating hole of the driving handle are aligned with the main hinge hole and second hinge hole of the main body, the activating teeth portion of the driving handle engage with the gearing teeth portion of the second body, the restricting piece attaches to one side of the second body and driving handle, the third through hole and the sliding trough align with the second through hole of the second body and driving handle, and the hinge unit passes therethrough.

2. The pair of scissors of claim 1, wherein the main body extends downward through the main hinge hole to form a handle, the conjugating portion of the driving handle is disposed in the receiving space of the second body, the fan-shaped activating teeth portion is formed corresponding to the gearing teeth portion, and extends downward to form a second handle.

3. The pair of scissors of claim 2, wherein the tool portion of the main body and the second tool portion of the second body are of the shape of straight blade to form a cutting status.

4. The pair of scissors of claim 1, wherein the tool portion of the main body and the second tool portion of the second body represent a blade and an anvil.

* * * * *